United States Patent [19]

Schneider et al.

[11] Patent Number: 5,439,631
[45] Date of Patent: Aug. 8, 1995

[54] PROCESS FOR MANUFACTURING A GRID-PATTERNED MEMBRANE

[76] Inventors: Paul R. Schneider, 12524 Aqueduct Dr., E. Tacoma, Wash. 98445; Gregory L. Lindstrom, 3018 Marne, Auburn, Wash. 98002

[21] Appl. No.: 214,399
[22] Filed: Mar. 16, 1994
[51] Int. Cl.$^6$ ............... B29C 33/68; B29C 59/02
[52] U.S. Cl. .................. 264/293; 264/316; 425/89
[58] Field of Search ........ 264/284, 293, 316; 425/89

[56] References Cited

U.S. PATENT DOCUMENTS

| | | | |
|---|---|---|---|
| 3,373,068 | 3/1968 | Grosheim et al. | 156/219 |
| 4,548,859 | 10/1985 | Kline et al. | 428/251 |
| 4,702,376 | 10/1987 | Pagliaro | 206/524.8 |
| 4,975,311 | 12/1990 | Lindgren | 428/156 |
| 5,129,813 | 7/1992 | Shepherd | 425/504 |
| 5,316,462 | 5/1994 | Seemann | 425/112 |

*Primary Examiner*—Leo B. Tentoni
*Attorney, Agent, or Firm*—Dean A. Craine

[57] ABSTRACT

A process for manufacturing a sheet of grid-patterned membrane for use in vacuum bagging processes which includes the steps of selecting equal size sheets of open weave mesh material, elastomeric material, and separator material. The sheet of elastomeric material is aligned over the sheet of mesh material while the sheet of separator material is aligned over the opposite side of the mesh material and then tightly wound onto a drum to create a continuous roll structure. The continuous roll structure is then autoclaved with sufficient pressure and temperature until the elastomeric material partially extrudes through the openings on the sheet of mesh material and makes contacts with the sheet of separator material to create a well defined grid pattern on one surface of the sheet of elastomeric material. After curing, the sheets of mesh material and separator material are separated to produce a sheet of grid-patterned membrane which may be cut to any desired size.

10 Claims, 4 Drawing Sheets

PROCESS FOR MANUFACTURING A GRID-PATTERNED MEMBRANE

BACKGROUND OF THE INVENTION

1. Field of the Invention

The invention disclosed herein pertains to processes used to manufacture elastomeric membranes used in vacuum pressure molding processes and, more particularly, to processes in which a breather pattern is incorporated into the surface of the elastomeric membrane.

2. Description of the Related Art

The production of various types of laminated or composite articles uses a process known as vacuum bagging or vacuum pressure molding. In the process, an impervious or non-porous envelope or membrane made of flexible material is disposed around the article to be laminated. The envelope or membrane is connected to a vacuum pump which evacuates the air inside the envelope or membrane and causes compressive pressure to be applied to the article.

In order to facilitate removal of the air inside the envelope or membrane, porous breather material is often placed between the membrane and the article. Typically, the breather material is made of polyester felt, coarse woven cotton, or fiberglass cloth.

To eliminate the use of breather material, silicone rubber membranes have been developed with patterns formed therein which enable air to escape to a vacuum port during use. One method used to manufacture silicone rubber membranes incorporating a breather pattern is to place a flat sheet of silicone rubber against a surface which will transfer its pattern to the sheet of silicone rubber when cured. This surface might be a machined metal plate, perforated metal, screen made of metal, plastic, or fiberglass, or coarse fabric. Because of the high labor and material costs associated with this method, membranes produced by this method are relatively expensive to produce.

Another method used to manufacture silicone rubber membranes incorporating a breather pattern formed therein is to interleave a sheet of coarse, closed-weave fabric treated with a release agent into a roll of uncured silicone rubber. A closed-weave fabric has very little space or no space between the threads. After the silicone rubber cures, the silicone rubber is unrolled and the sheet of fabric is removed thereby leaving an impression of the fabric design on one surface of the silicone rubber. One problem with this method is that the pattern created on the surface of the silicone rubber is shallow. As a result, the pattern is lost at high vacuum pressures and, more importantly, under autoclave conditions and does not allow air to escape.

Still another method of incorporating breathing characteristics into silicone rubber is to bond breather material to one surface of the breather material. In a vacuum pressure molding situation, this prevents the silicone rubber from stretching and conforming to the article being molded, causing high and low pressure areas on the article. Also, any resin that flows during the vacuum pressure molding process, will contaminate and fill the breather material, rendering it useless for further cures.

A cost-efficient process for high volume manufacturing of a sheet of elastomeric material with a well defined pattern formed therein which resists deformation under vacuum and autoclave conditions would be highly desirable.

SUMMARY OF THE INVENTION

It is an object of the present invention to provide a process for manufacturing elastomeric membranes used in vacuum pressure molding processes.

It is another object of the present invention to provide such a process in which the elastomeric membrane has a well defined pattern created on one surface thereof.

It is a further object of the present invention to provide such a process for economically manufacturing such membranes in large volumes.

These and other objects of the invention are met by providing a process for economically manufacturing in large volumes, elastomeric membranes for use in vacuum pressure molding process with a well defined pattern created on one surface thereof.

The process described herein is used to produce a sheet of elastomeric material with a grid pattern formed on one surface thereof. The grid pattern consists of a plurality of perpendicularly aligned channels molded into one surface of a sheet made of elastomeric material. The channels have sufficient width and depth and are sufficiently spaced apart so that the grid pattern created is resistant to deformation under high vacuum pressures and under autoclave conditions. The grid pattern is characterized as being well defined by having a relatively high percentage of flat area which lies in the same plane as the membrane with plurality of breathing channels formed therein. The sheet of elastomeric material has an "appearance" of having individual channels machined or molded into one surface.

The membrane is manufactured by placing a sheet of open weave mesh material adjacent to a sheet of uncured elastomeric material, such as silicone rubber. The mesh material has a plurality of perpendicularly aligned strands and openings therebetween. In the preferred embodiment, the mesh material is made of aramid fiber or fiberglass material and is coated with polytetrafluoroethylene, sold under the trademark "TEFLON" or some other suitable release agent so that it releases from the sheet of silicone rubber after curing. A thin sheet of separator material is placed adjacent to the sheet of mesh material on the surface to the sheet of elastomeric material. During manufacturing process, the mesh material is forced into the surface of the uncured elastomeric material which causes the elastomeric material to extrude through the openings in the mesh material. The thin sheet of separator material prevents adjacent portions of the elastomeric material from bonding together and prevents excessive extrusion of the elastomeric material through the mesh material.

When the elastomeric material has cured and the sheets of separator material and mesh material are removed, a well defined grid pattern made of a plurality of perpendicularly aligned channels of uniform depth, width, and spacing is created on one surface of the sheet of silicone rubber.

In summary, a novel process of manufacturing a sheet of membrane material with a grid pattern created on one surface is disclosed herein which comprises the following steps: (1) selecting a sheet of open weave mesh material; (2) selecting a thin sheet of separator material approximately equal in length and width to the sheet of mesh material; (3) selecting a sheet of uncured elastomeric material approximately equal in length and width to the sheet of mesh material; (4) simultaneously aligning the thin sheet of separator material over the sheet of mesh material and simultaneously aligning the sheet of elastomeric material over the thin sheet of separator material and tightly winding the stacked sheets onto a drum to create a continuous roll structure; (5) autoclaving the continuous roll structure with sufficient pressure and temperature so that the elastomeric material partially extrudes through the openings on the adjacent sheet of mesh material and makes contacts with the thin sheet of separator material located on the opposite side there of to create a grid pattern on the sheet of elastomeric material; (6) allowing the sheet of elastomeric material to cure to form a sheet of grid-pattern membrane, and; (7) separating the sheet of grid-patterned membrane from the sheets of mesh material and separator material.

DESCRIPTION OF THE PREFERRED EMBODIMENT(S)

Figure 1:
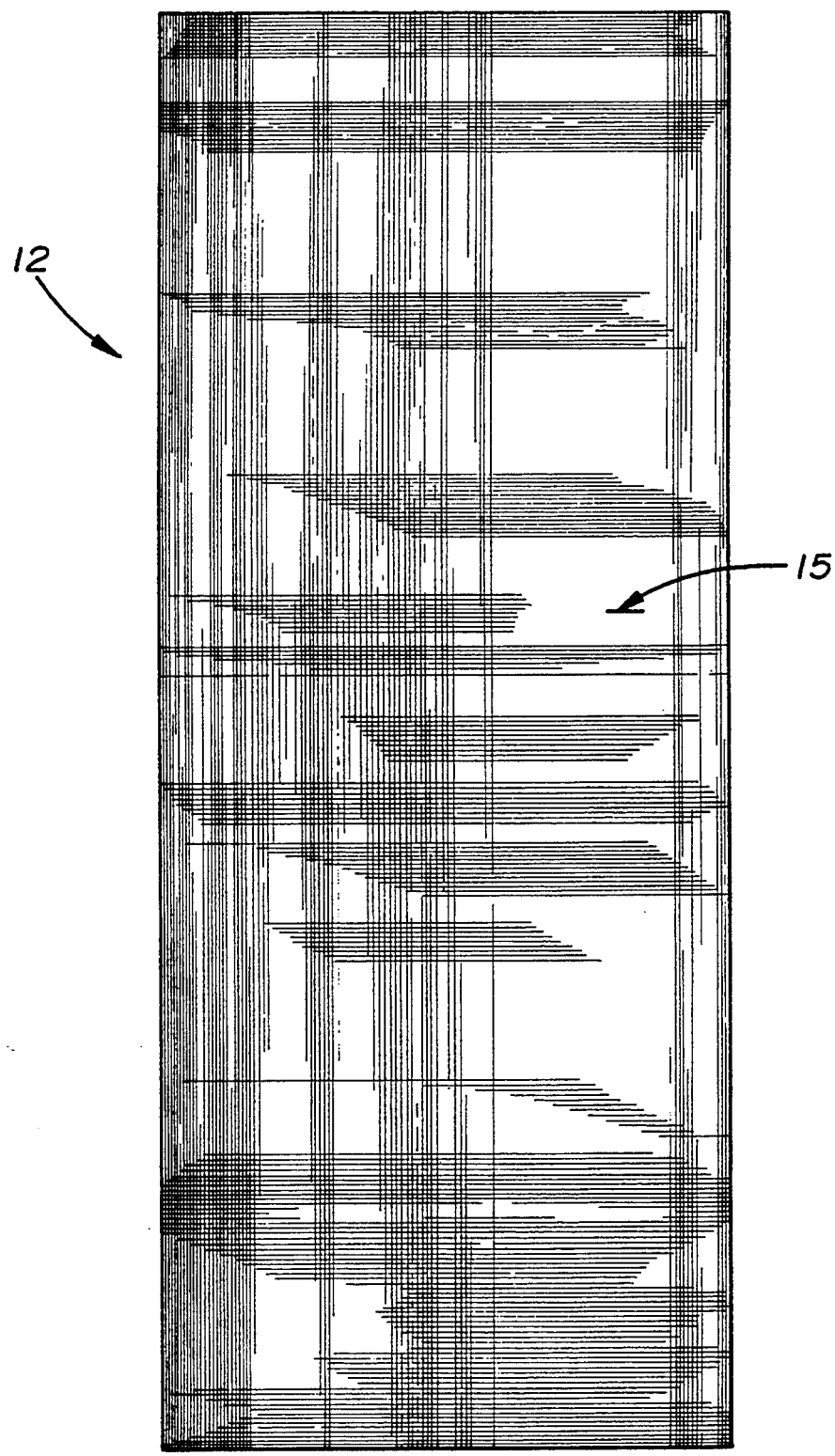
FIG. 1 is a top plan view of the sheet of the grid patterned membrane manufactured by the process disclosed herein.
Figure 2:
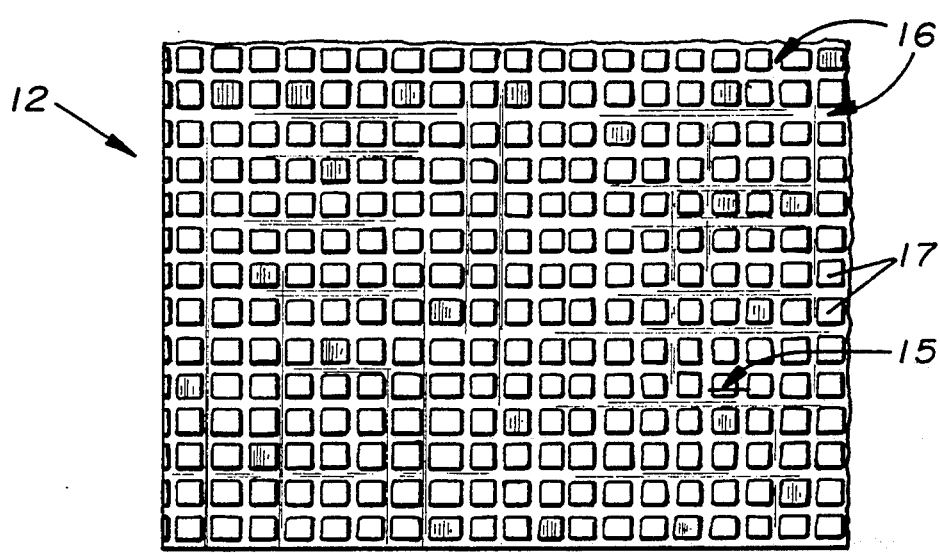
FIG. 2 is a top plan view of a section of the grid patterned membrane illustrated in FIG. 1.
Figure 3:
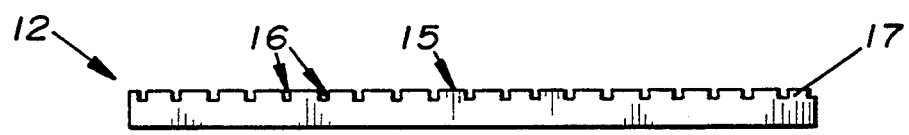
FIG. 3 is a side elevation view of the section of the grid patterned membrane illustrated in FIG. 2.

Disclosed herein is a method for economically manufacturing a grid patterned membrane 12, as shown in FIG. 1, designed for use in vacuum pressure molding processes with a well defined grid pattern 15 formed on one surface thereof as shown in greater detail in FIG. 2. The grid pattern 15 acts as a breather pattern which enables air to escape under the membrane 12 when used during the vacuum pressure molding process.

The grid patterned membrane 12 comprises a thin base sheet 25 made of elastomeric material, such as silicone rubber, sufficiently large so that it may be manufactured in economical quantities. The grid pattern 15 formed by molding perpendicularly aligned channels 16 into one surface of the base sheet 25. The channels 16 are formed by allowing the base sheet 25 to partially extrude through openings 32 located on a sheet 30 of mesh material placed adjacent to one surface of the base sheet 25.

The novel process of manufacturing the grid-patterned membrane 12 comprises the following steps: (1) selecting a sheet 30 of open weave, mesh material; (2) selecting a base sheet 25 made of uncured elastomeric material approximately equal in length and width to the sheet 30 of mesh material; (3) selecting a thin sheet 40 of separator material approximately equal in length and width to the sheet of mesh material 30; (4) simultaneously aligning the thin sheet 40 of separator material over the sheet 30 of mesh material and simultaneously aligning the base sheet 25 over the thin sheet 40 of separator material and winding the aligned sheets, 25, 30, 40 onto to a drum to create a continuous roll structure 20; (5) autoclaving the continuous roll structure 20 with sufficient pressure and temperature until the elastomeric material on the base sheet 25 partially extrudes through the openings 32 on the sheet 30 of mesh material and makes contacts with the thin sheet 40 of separator material 40 to create a grid pattern 15 in the base sheet 25; (6) allowing the base sheet 25 to cure to form a large sheet 12 of grid-patterned membrane, and; (7) separating the sheet 12 of grid-patterned membrane from the sheets of mesh material and separator material, 30 and 40, respectively.

The above process may be modified by interleaving the thin sheet 40 of separator material onto one surface of the base sheet. In this instance, steps 2 and 3 are combined into step (2') which comprises selecting a base sheet 25 made of uncured elastomeric material having a thin sheet 40 of separator material approximately equal in length and width thereto interleave thereto on one surface of said base sheet 25, said base sheet 25 being approximately equal in length and width to the sheet 30 of mesh material; Step (4) is modified into step (3') which comprises simultaneously aligning said base sheet so that the thin sheet 40 of separator material interleaved therewith is placed over the sheet 30 of mesh material and winding the aligned base sheet 25 and sheets of mesh material 30, onto to a drum 21 to create a continuous roll structure 20.

Figure 4:
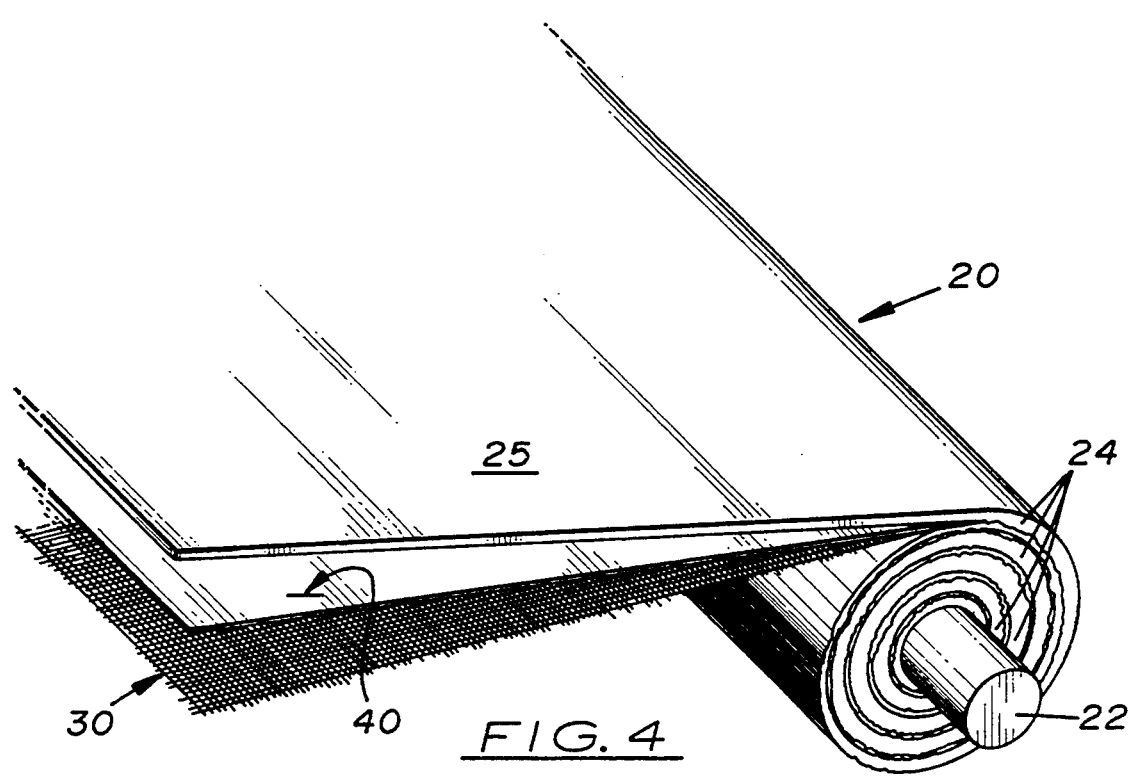
FIG. 4 is a perspective view of a continuous roll structure produced by winding the base sheet and the sheets of mesh material and separator material.
Figure 5:
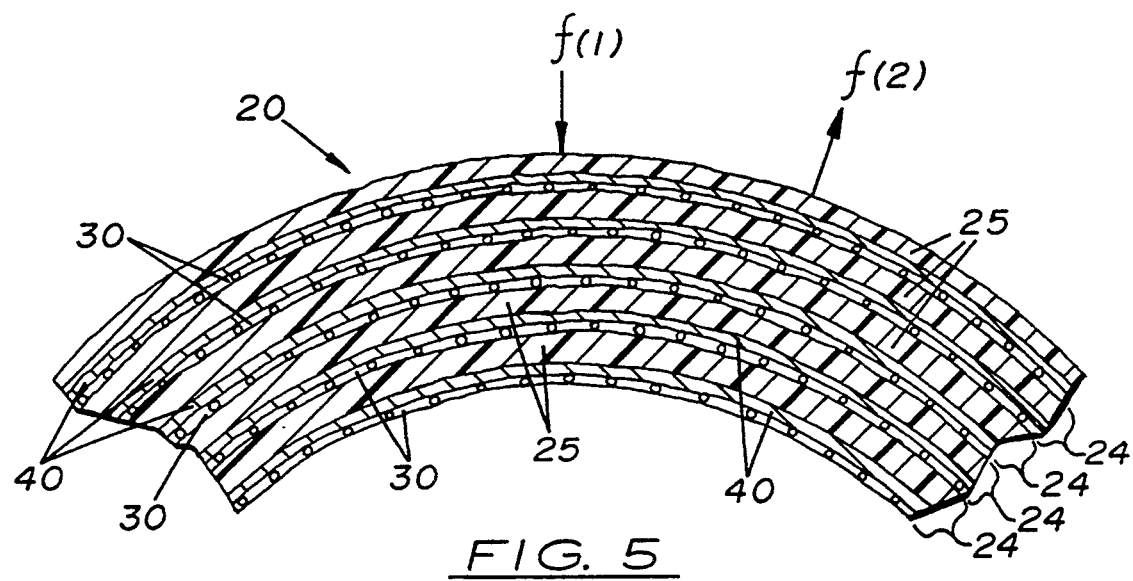
FIG. 5 is a sectional, side elevational view of a three sheets of material wound into a continuous roll structure.
Figure 6:
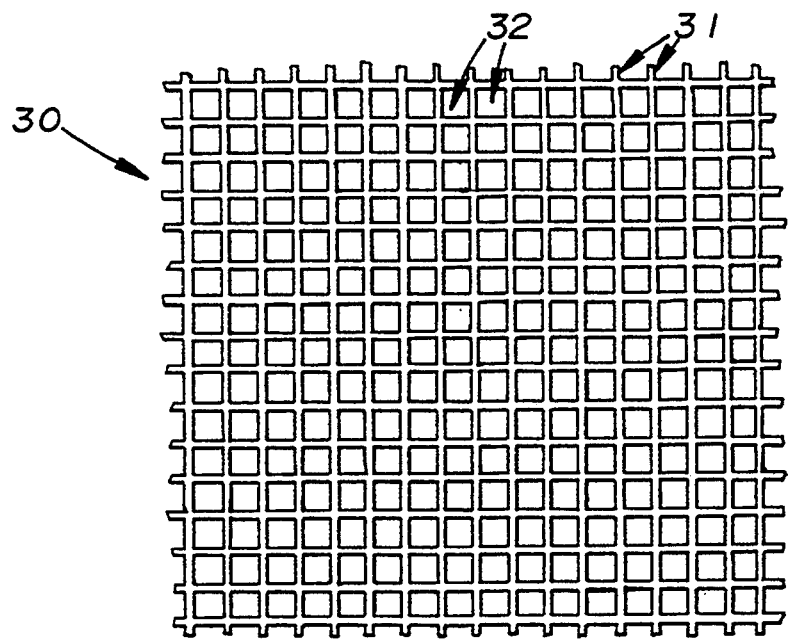
FIG. 6 is a top plan view of the mesh material.

FIG. 4 shows the base sheet 25 and two adjacent sheets 30, 40 being aligned and wound onto a drum 22 to form a continuous roll structure 20. As the three sheets, 25, 30, and 40, are wound together, they may be adjusted to prevent the formation of wrinkles. When the continuous roll structure 20 is formed, a plurality of concentric rings 24 is created on the continuous roll structure 20 as shown in FIG. 5. When external heat and pressure applied to the outer surface of the continuous roll structure 20, the section of mesh material 30 located on the outer concentric ring 24 adjacent thereto is forced inward by an external force f(1). Simultaneously, the outward directed expansion force f(2) created as the elastomeric material cures. In combination, forces f(1) and f(2) cause the strands 31 on the mesh material to be forced against the surface of the adjacent base sheet 25 located directly inward therefrom. As the mesh material is forced inward, the portion of the base sheet 25 located directly beneath it extrudes through the openings 32. The adjacent surface of the thin sheet 40 of separator material located on the adjacent, outer disposed concentric ring 24 acts as a barrier surface to prevent the elastomeric material on the adjacent base sheets from bonding together. Also, The thin sheet 40 acts as a stop surface for the lower elastomeric material by preventing the elastomeric material from continuing completely through the mesh material.

In the preferred embodiment, the base sheet 25 is made of silicone rubber material and measures approximately 36–60 inches wide, 20–50 feet in length, and 0.11 inches thick. The sheet 30 of mesh material is made of aramid fiber, sold under the trademark "KEVLAR" TM, or fiberglass material coated with polytetrafluorethylene, sold under the trademark "TEFLON" or some other suitable release agent so that sheet 30 releases from the base sheet 25 after curing. The strands 31 on the sheet 30 of mesh material measure approximately 0.03 inches thick while the openings 32 therein are square with each side measuring approximately 0.2 inches in length. The sheet 30 of mesh material is sufficiently durable to enable it to be reused.

The thin sheet 40 of synthetic fiber separator material is made of such as "DACRON" TM, cloth material treated with an appropriate release agent. The sheet 40 is approximately 0.004 inches thick and has approximately the same dimensions as the base sheet 25 and mesh sheet 30.

The channels 16 are approximately 0.04 inches deep and 0.03 inches wide. The columns 17 created between the channels 16 are approximately 0.2 inches square.

In compliance with the statute, the invention has been described in language more or less specific as to structural features. It should be understood, however, that the invention is not limited to the specific features shown since the means and construction shown comprises the preferred forms of putting the invention into effect. The invention is, therefore, claimed in any of its forms or modifications within the legitimate and valid scope of the amended claims, appropriately interpreted in accordance with the doctrine of equivalents.

We claim:

1. A process for manufacturing a grid patterned membrane, comprising the following steps:
   a. selecting a sheet of mesh material;
   b. selecting a sheet of uncured elastomeric material approximately equal in length and width to said sheet of mesh material;
   c. selecting a thin sheet of separator material approximately equal in length and width to said sheet of mesh material;
   d. simultaneously aligning said sheet of elastomeric material over said sheet of mesh material and simultaneously aligning said thin sheet of separator material over said sheet of elastomeric material and then winding said aligned sheets onto a drum to create a continuous roll structure;
   e. autoclaving said continuous roll structure with sufficient pressure and temperature until the elastomeric material partially extrudes through the openings on the sheet of mesh material and makes contacts with the thin sheet of separator material located on the opposite surface of said sheet of mesh material to create a grid pattern in said sheet of elastomeric material;
   f. allowing said sheet of elastomeric material to cure, and;
   g. separating said sheet of elastomeric material from the sheets of mesh material and separator material to form a sheet of grid-patterned membrane.

2. A process as recited in claim 1, wherein said sheet of elastomeric material is made of silicone rubber.

3. A process as recited in claim 2, wherein said sheet of mesh material is made of aramid fiber material covered with a release agent.

4. A process as recited in claim 2, wherein said sheet of mesh material is made of fiberglass material covered with a release agent.

5. A process as recited in claim 2, wherein said thin sheet of separator material is made of cloth material made of synthetic fibers.

6. A process for manufacturing a grid patterned membrane, comprising the following steps:
   a. selecting a sheet of mesh material;
   b. selecting a base sheet made of uncured elastomeric material having a thin sheet of separator material approximately equal in length and width thereto interleaved on one surface of said base sheet, said base sheet being approximately equal in length and width to said sheet of mesh material;
   c. simultaneously aligning said base sheet so that said sheet of separator material interleaved therewith is placed over said sheet of mesh material and, winding said base sheet, said sheet of mesh material, and said sheet of separator material onto a drum to create a continuous roll structure;
   d. autoclaving said continuous roll structure with sufficient pressure and temperature until the elastomeric material on said base sheet partially extrudes through the openings and said sheet of mesh material and makes contact with said sheet of separator material to create a grid pattern in said sheet of base sheet;
   e. allowing said sheet of base sheet to cure to permanently form said grid pattern thereon, and;
   f. separating said sheet of base sheet from said sheets of mesh material and separator material.

7. A process as recited in claim 6, wherein said sheet of base sheet is made of silicone rubber.

8. A process as recited in claim 6, wherein said sheet of mesh material is made of aramid fiber material covered with a release agent.

9. A process as recited in claim 7, wherein said sheet of mesh material is made of fiberglass material covered with a release agent.

10. A process as recited in claim 6, wherein said thin sheet of separator material is made of cloth material made of synthetic fibers.

* * * * *